(12) United States Patent
Floyd et al.

(10) Patent No.: US 8,448,006 B2
(45) Date of Patent: May 21, 2013

(54) PERFORMING VIRTUAL AND/OR PHYSICAL RESOURCE MANAGEMENT FOR POWER MANAGEMENT

(75) Inventors: Michael S. Floyd, Cedar Park, TX (US); Christopher Francois, Shakopee, MN (US); Naresh Nayar, Rochester, MN (US); Karthick Rajamani, Austin, TX (US); Freeman L. Rawson, III, Austin, TX (US); Randal C. Swanberg, Round Rock, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/907,190

(22) Filed: Oct. 19, 2010

(65) Prior Publication Data

US 2012/0096293 A1 Apr. 19, 2012

(51) Int. Cl.
*G06F 1/32* (2006.01)

(52) U.S. Cl.
USPC ............................................ 713/323; 713/324

(58) Field of Classification Search
USPC ................................................ 713/300–340
See application file for complete search history.

(56) References Cited

U.S. PATENT DOCUMENTS

| 7,076,682 | B2 | 7/2006 | Jacobson |
| 7,194,641 | B2 | 3/2007 | Hack |
| 7,194,645 | B2 * | 3/2007 | Bieswanger et al. ......... 713/320 |
| 7,334,142 | B2 | 2/2008 | Hack |
| 7,388,839 | B2 | 6/2008 | Chafle et al. |
| 7,444,526 | B2 * | 10/2008 | Felter et al. ................... 713/300 |
| 7,448,037 | B2 | 11/2008 | Arimilli et al. |
| 7,484,110 | B2 | 1/2009 | Stufflebeam |
| 7,493,478 | B2 | 2/2009 | Arimilli et al. |
| 7,530,071 | B2 | 5/2009 | Billau et al. |

(Continued)

FOREIGN PATENT DOCUMENTS

| CN | 101685335 A | 3/2010 |
| EP | 2 071 458 A1 | 6/2009 |

OTHER PUBLICATIONS

Mahapatra, Rabi N. et al., "An Energy-Efficient Slack Distribution Technique for Multimode Distributed Real-Time Embedded Systems", IEEE Transactions on Parallel and Distributed Systems, vol. 16, No. 7, Jul. 2005, pp. 650-662.

(Continued)

*Primary Examiner* — Raymond Phan
(74) *Attorney, Agent, or Firm* — Francis Lammes; Stephen J. Walder, Jr.; Libby Z. Toub

(57) ABSTRACT

A mechanism is provided for directed resource folding for power management. The mechanism receives a set of static platform characteristics and a set of dynamic platform characteristics for a set of resources associated with the data processing system thereby forming characteristic information. The mechanism determines whether one or more conditions have been met for each resource in the set of resources using the characteristic information. Responsive to the one or more conditions being met, the mechanism performs a resource optimization to determine at least one of a first subset of resources in the set of resources to keep active and a second subset of resources in the set of resources to dynamically fold. Based on the resource optimization, the mechanism performs either a virtual resource optimization to optimally schedule the first subset of resources or a physical resource optimization to dynamically fold the second subset of resources.

15 Claims, 6 Drawing Sheets

U.S. PATENT DOCUMENTS

| | | | |
|---|---|---|---|
| 7,730,248 B2 * | 6/2010 | Goss et al. | 710/261 |
| 2007/0094525 A1 | 4/2007 | Uguen et al. | |
| 2008/0091964 A1 | 4/2008 | Hack | |
| 2008/0104587 A1 | 5/2008 | Magenheimer et al. | |
| 2008/0301473 A1 | 12/2008 | Perez et al. | |
| 2009/0037712 A1 * | 2/2009 | Mallik et al. | 713/1 |
| 2009/0049314 A1 * | 2/2009 | Taha et al. | 713/300 |
| 2009/0089481 A1 | 4/2009 | Kapoor et al. | |
| 2009/0106571 A1 | 4/2009 | Low et al. | |
| 2009/0132840 A1 | 5/2009 | Talwar et al. | |
| 2009/0177903 A1 * | 7/2009 | Rozen et al. | 713/322 |
| 2009/0199019 A1 * | 8/2009 | Hongisto et al. | 713/300 |
| 2009/0282300 A1 | 11/2009 | Heyrman et al. | |
| 2009/0307713 A1 | 12/2009 | Anderson et al. | |
| 2010/0037038 A1 | 2/2010 | Bieswanger et al. | |
| 2010/0146513 A1 | 6/2010 | Song | |
| 2011/0320840 A1 | 12/2011 | Nayar et al. | |
| 2012/0096293 A1 | 4/2012 | Floyd et al. | |

OTHER PUBLICATIONS

Xue, Zhenghua et al., "An energy-efficient management mechanism for large-scale server clusters", IEEE Asia-Pacific Services Computing Conference, Dec. 11-14, 2007, pp. 509-516.

USPTO U.S. Appl. No. 12/821,789, 1 page.

Chen, Xiaoxin et al., "Overshadow: A Virtualization-Based Approach to Retrofitting Protection in Commodity Operating Systems", ACM Digital Library, Mar. 2008, 12 pages.

Padala, Pradeep et al., "Adaptive Control of Virtualized Resources in Utility Computing Environments", ACM Digital Library, Mar. 2007, 14 pages.

Ueno, H et al., "Virtage: Hitachi's Virtualization Technology", INSPEC/IEEE; 2009, 1 page.

Wang, Yi et al., "Virtual Routers on the Move: Live Router Migration as a Network-Management Primitive", ACM Digital Library, Mar. 2008, 12 pages.

International Search Report and Written Opinion dated Sep. 30, 2011 for International Application No. PCT/EP2011/059425, 12 pages.

Interview Summary mailed Sep. 28, 2012 for U.S. Appl. No. 13/457,030; 3 pages.

Notice of Allowance mailed Oct. 15, 2012 for U.S. Appl. No. 12/821,789; 9 pages.

Notice of Allowance mailed Dec. 5, 2012 for U.S. Appl. No. 13/457,030; 8 pages.

Response to Office Action filed Sep. 14, 2012, U.S. Appl. No. 13/457,030, 12 pages.

Interview Summary dated Jul. 16, 2012 for U.S. Appl. No. 12/821,789; 3 pages.

Office Action mailed Apr. 27, 2012 for U.S. Appl. No. 12/821,789; 23 pages.

Preliminary Amendment filed Apr. 26, 2012 for U.S. Appl. No. 12/821,789; 8 pages.

Response to Office Action filed Jul. 20, 2012, U.S. Appl. No. 12/821,789, 10 pages.

USPTO U.S. Appl. No. 13/457,030, 1 page.

Siddha, Suresh et al., "Chip Multi Processing aware Linux Kernel Scheduler", Jul. 20-23, 2005, vol. 2, pp. 193-202.

* cited by examiner

PERFORMING VIRTUAL AND/OR PHYSICAL RESOURCE MANAGEMENT FOR POWER MANAGEMENT

GOVERNMENT RIGHTS

This invention was made with Government support under DARPA, HR0011-07-9-0002. THE GOVERNMENT HAS CERTAIN RIGHTS IN THIS INVENTION.

BACKGROUND

The present application relates generally to an improved data processing apparatus and method and, more specifically, to mechanisms for directed resource folding, i.e. freeing resources by limiting the set of resources between which tasks are distributed, in order to provide more efficient power management.

Many modern data processing system architectures utilize operating system and virtualization mechanisms, e.g., hypervisors, to perform resource management. Operating systems and hypervisors are in-band resource managers on data processing systems that manage the allocation of virtual and physical resources to processes/tasks. They determine when, and what, physical resources get used by which tasks executing in the data processing system. In the most prevalent mode of operation, the resource scheduler/dispatcher/manager of the operating system or hypervisor has a load-balancing component that distributes the tasks evenly among the available resources to ensure good performance.

Known mechanisms for performing this load-balancing do so independent of any considerations from the platform, i.e. hardware and firmware, such as the basic input/output system (BIOS), service firmware, and the like. To the contrary, the load-balancing mechanisms use only information available at the resource scheduling layer, such as resource utilization, task priority, static resource organization information (such as core topology in terms of which cores map to a socket), etc. There is no runtime feedback from a lower platform layer that is used to optimize the implementations of these load-balancing mechanisms.

SUMMARY

In one illustrative embodiment, a method, in a data processing system, is provided for directed resource folding for power management. The illustrative embodiment receives at least one of a set of static platform characteristics that identifies operation parameters of a set of resources under no load and a set of dynamic platform characteristics that identifies operation parameters of the set of resources under load associated with the data processing system thereby forming characteristic information. The illustrative embodiment determines whether one or more conditions have been met for each resource in the set of resources using the characteristic information. In the illustrative embodiment, the resource usage conditions identify one or more conditions under which a configuration of one or more resources in the set of resources needs to be modified. The illustrative embodiment performs a resource optimization to determine at least one of a first subset of resources in the set of resources to keep active and a second subset of resources in the set of resources to dynamically fold in response to the one or more conditions being met. The illustrative embodiment performs at least one of a virtual resource optimization in order to optimally schedule the first subset of resources by consolidation of at least one of resource activities, task, or workload or a physical resource optimization in order to dynamically fold the second subset of resources based on the resource optimization.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
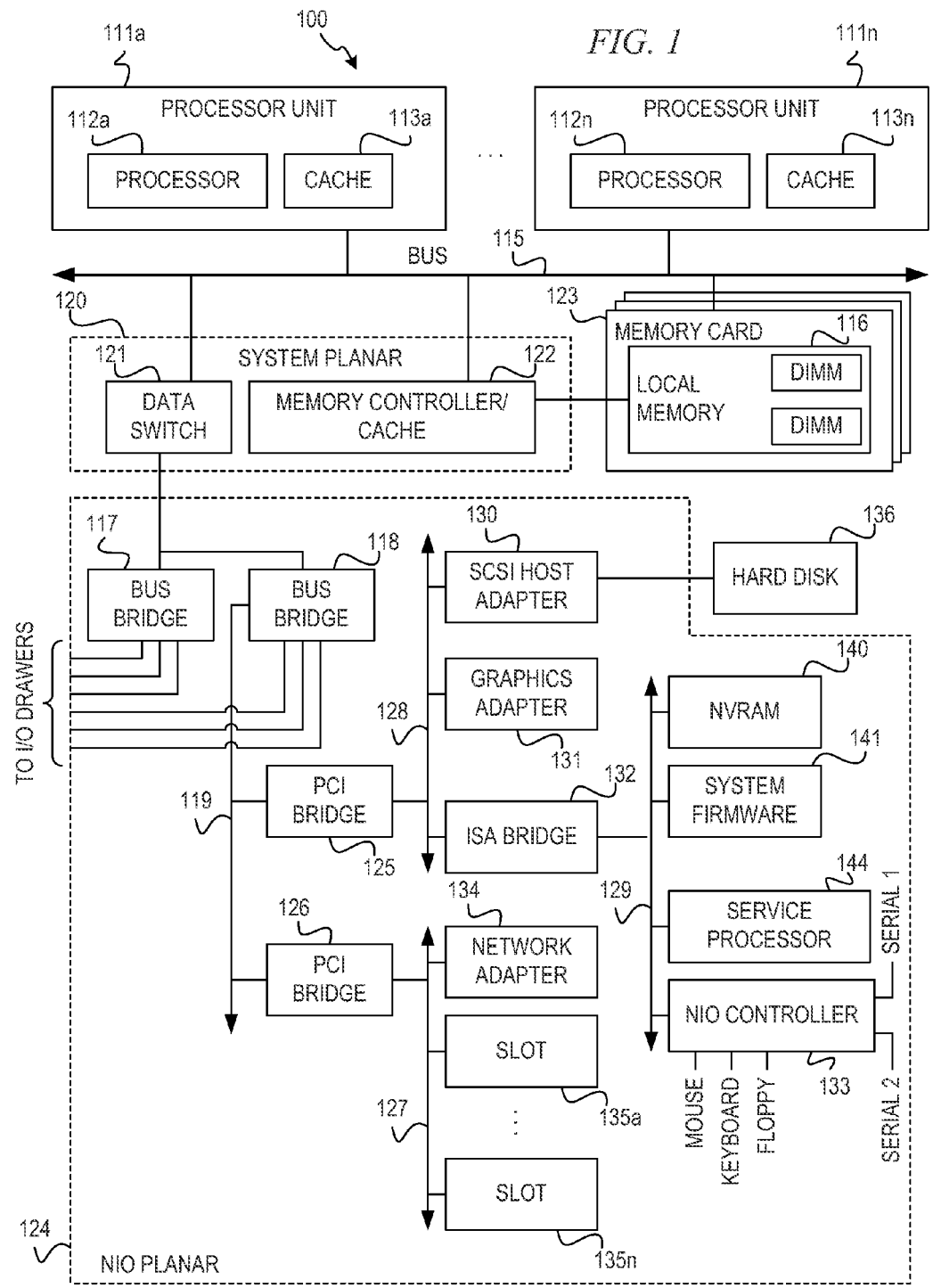
FIG. 1 depicts a block diagram of a data processing system with which aspects of the illustrative embodiments may advantageously be utilized.

The illustrative embodiments provide mechanisms for directed resource folding, i.e. freeing resources by limiting the set of resources between which tasks are distributed, in order to provide more efficient power management. Power and thermal management in data processing systems is of increasing concern in modern data processing system architectures. Data processing systems are being designed to operate in a more power-efficient manner, e.g., to be "green" machines. Moreover, it is desirable to implement, in such data processing systems, an ability to set policies that perform trade-off decision making with regard to power and performance in order to meet particular objectives. For example, it is often desirable to be able to over-provision installations relative to the nominal maximum power and temperature values of the data processing systems that are installed but be able to take advantage of the variability in workloads and utilization to ensure that the data processing systems operate correctly and within the limits of the available power and cooling.

One mechanism that provides an ability to perform such trade-off decision making and implement the results of such decisions is the ability to "fold" resources. The concept of "folding" resources involves the freeing up of resources by limiting the set of resources between which the tasks are distributed. This is done by limiting the set of resources to only a subset of the available resources. By "folding" the resources, the distribution of the current set of tasks by the operating system and/or hypervisor are made to the freed resources that are not within the subset of resources selected for the folded set of resources. Thus, the freed resources are made available for (1) additional tasks (thereby providing spare capacity), (2) donation to other resource pool managers (e.g., donate to a different partition of the data processing system), and/or (3) to be put into a lower-power idle mode to reduce power consumption.

As an example, operating systems in charge of partitions running in virtualized environments may be associated with virtualized processors assigned by a hypervisor with the operating systems then scheduling tasks/workloads on these virtualized processors. When the aggregate load seen by the operating system is low, an operating system may "fold" or release a virtual processor to the hypervisor, thereby enabling the hypervisor to put the corresponding physical processor upon which the virtual processor is executing, into a low-power mode if the net demand for physical processors is also low, or utilize it for other partitions. There may be a one-to-one correspondence between virtual processors and physical processors for dedicated partitions, while for shared pool partitions, the hypervisor manages a dynamic mapping between virtual processors and physical processors. In either case, the released processor resources may subsequently be "unfolded" or reclaimed by a partition's operating system from the hypervisor when a load on the partition increases.

The decision on which specific virtual/physical resource to fold/unfold, in power/thermal constrained environments, may have significant impact on the energy-efficiency and/or performance of the partition and the data processing system as a whole. Relevant information for deciding on the right resource to fold/unfold resides primarily with physical resource state management firmware. This information may be used both at the operating systems layer as well as the hypervisor layer to make energy-efficient resource folding/unfolding decisions.

The illustrative embodiments provide an improved mechanism for directed resource folding for power management. The mechanism uses runtime feedback and/or communication between the platform, such as firmware, hardware, or the like, and resource scheduling layers, such as operation systems, virtualization mechanisms, e.g., hypervisors, or the like, for optimal management of resources by either an operating system, a virtualization mechanism (e.g., hypervisor), or the like. Some examples of runtime feedback information that may be communicated from a platform to a resource scheduling layer for better power management may include: power/thermal information related to specific resources, constraints favoring 'freeing' one resource entity over another (e.g. core A is hotter than core B and so is a better candidate to be put into lower-power idle), constraints that assist in determining how many resource entities need to be freed, or the like. It should be noted that the term "freeing" with regard to resources is a term that is generally known in the art and is used herein as referring to the ability to identify a resources as being available for allocation to another task or process. By using runtime feedback and/or communication between the platform, such as firmware, hardware, or the like, and resource scheduling layers, such as operation systems, virtualization mechanisms, or the like, the illustrative embodiments provide for an optimal management of resources by either the operating system, the virtualization mechanism, or the like.

Figure 2:
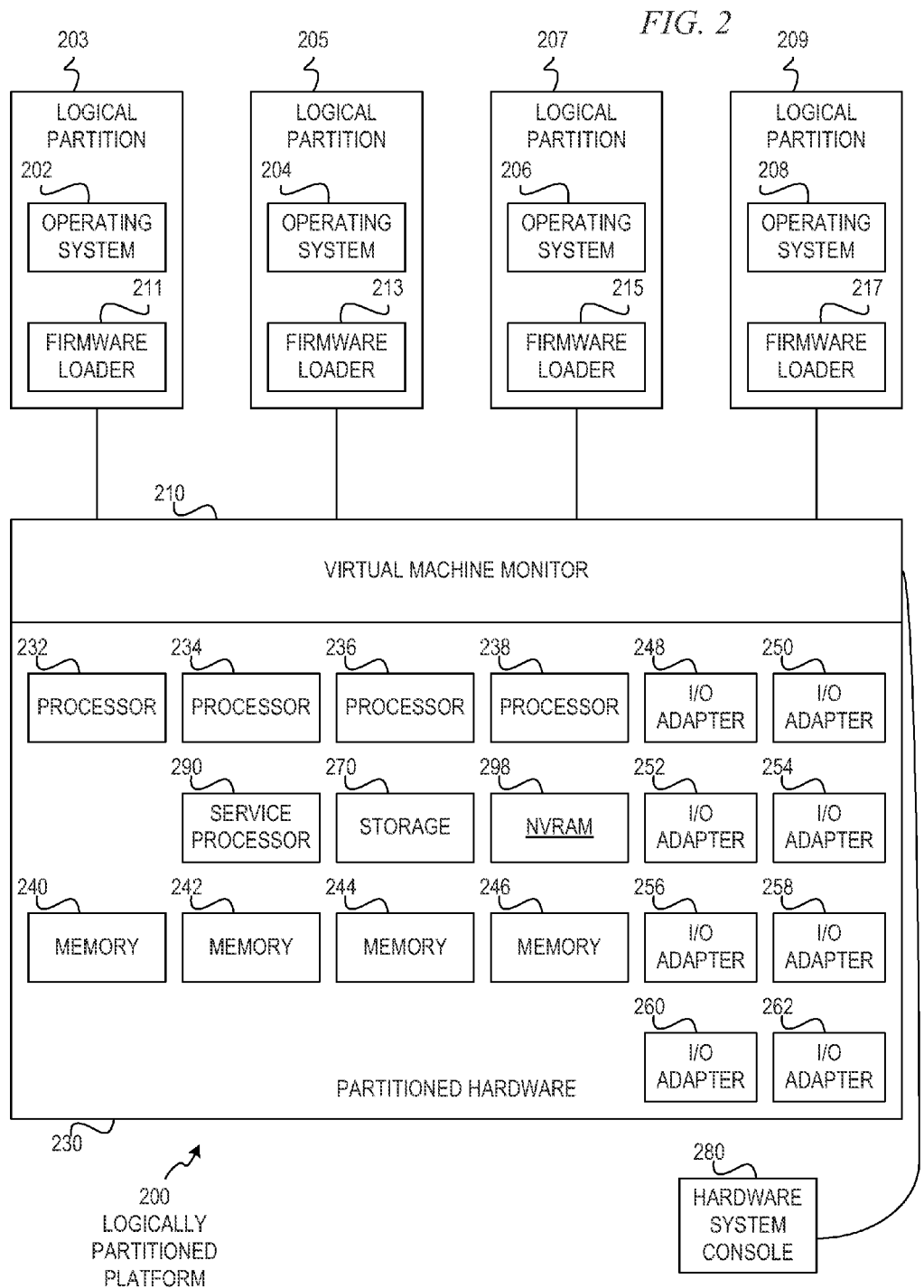
FIG. 2 depicts a block diagram of an exemplary logically partitioned platform in which the illustrative embodiments may be implemented.

The mechanisms of the illustrative embodiments may be utilized by, and implemented in, many different types of data processing environments. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for directed resource folding for power management, this is only an example and is not intended to state or imply any limitation with regard to the features of the present invention.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111*a*-111*n*. Each of processor units 111*a*-111*n* includes a processor and a cache memory. For example, processor unit 111*a* contains processor 112*a* and cache memory 113*a*, and processor unit 111*n* contains processor 112*n* and cache memory 113*n*.

Processor units 111*a*-111*n* are connected to main bus 115. Main bus 115 supports system planar 120 that contains processor units 111*a*-111*n* and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135a-135n via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

While the illustrative embodiments may be implemented in any type of data processing system, the following description is directed to a logically portioned system where resources, such as processors, memory, or the like, are apportioned by a virtualization mechanism based upon requests from operating systems in various partitions. By using runtime feedback and/or communication between the partitioned hardware, such as processor units 111a-111n or memory cards 123 of FIG. 1, and resource scheduling layers, such as operation systems 202-208 or virtual machine monitor 210 of FIG. 2, the illustrative embodiments provide for an optimal management of resources by the resource scheduling layers.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, logical partitions 203, 205, 207, and 209, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as virtual machine monitor 210, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Each of operating systems 202, 204, 206, and 208 may interface with a set of application programming interfaces (APIs) and one or more applications. While logically partitioned platform 200 illustrates only logical partitions 203, 205, 207, and 209, the illustrative embodiments are not limited to such. Rather, any number of logical partitions may be utilized with the mechanisms of the illustrative embodiments without departing from the spirit and scope of the present invention.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logically partitioned platform 200 may also make use of IBM®'s PowerVM™ Active Memory™ Sharing (AMS), which is an IBM® PowerVM™ advanced memory virtualization technology that provides system memory virtualization capabilities to IBM Power Systems, allowing multiple logical partitions to share a common pool of physical memory. The physical memory of IBM Power Systems® may be assigned to multiple logical partitions either in a dedicated or shared mode. A system administrator has the capability to assign some physical memory to a logical partition and some physical memory to a pool that is shared by other logical partitions. A single partition may have either dedicated or shared memory. Active Memory™ Sharing may be exploited to increase memory utilization on the system either by decreasing the system memory requirement or by allowing the creation of additional logical partitions on an existing system.

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, without departing from the spirit and scope of the present invention.

On a logically partitioned system, such as logically partitioned platform 200 of FIG. 2, the allocation of processor and memory resources is highly dependent on the partition configuration. In general, multiple partitions have processor and memory resources allocated from a single processor chip (cores on the processor chip and the memory behind the memory controllers on the chip). It is also possible that a partition may have resources allocated from multiple chips in the system. In general, the processor and memory allocation policies are geared towards optimal system performance. The processor and memory resources are allocated so that there is good affinity between a partition's processors and memory. However, these allocation policies may conflict with the power savings policies with regard to packing processor and memory resources. It should be noted that the term "packing" with regard to resources is a term that is generally known in the art and is used herein as referring to the ability optimally schedule a resource so that the resource is performing at optimal power and performance but within the limits of the available power and cooling for the resource and the data processing system.

Operating systems and virtualization mechanisms, such as operating systems 202, 204, 206, and 208 and virtual machine monitor 210 of FIG. 2, are in-band resource managers on computer systems that manage the allocation of virtual and physical resources to processes/tasks. These operating systems and virtualization mechanisms determine not only when a when physical resources are used for tasks but also what physical resources are used by which tasks. In the most prevalent mode of operation, a resource scheduler/dispatcher/manager at each level has a load-balancing component that distributes the tasks evenly among the available resources to ensure good performance.

The operating systems and virtualization mechanisms implement the concept of "folding" resources, which is discussed above. As mentioned above, the "folding" of resources frees resources by limiting the set of resources, between which the tasks are distributed, to only a subset of the available resources. That is folding is a technique used by an operating system to steer work away from one or more of its allocated resources. As the utilization of a resource by a logical partition decreases below a threshold, the operating system will fold an allocated resource such that no work is dispatched and no interrupts are directed to the folded resource. By 'folding' resources, such that the distribution of current set of tasks is made to only a subset of resources, the "freed" resources are then available for additional tasks (spare capacity), for donation to other resource pool managers (e.g. donate to a different partition), and/or to be put into lower-power idle modes to reduce power consumption.

Figure 3:
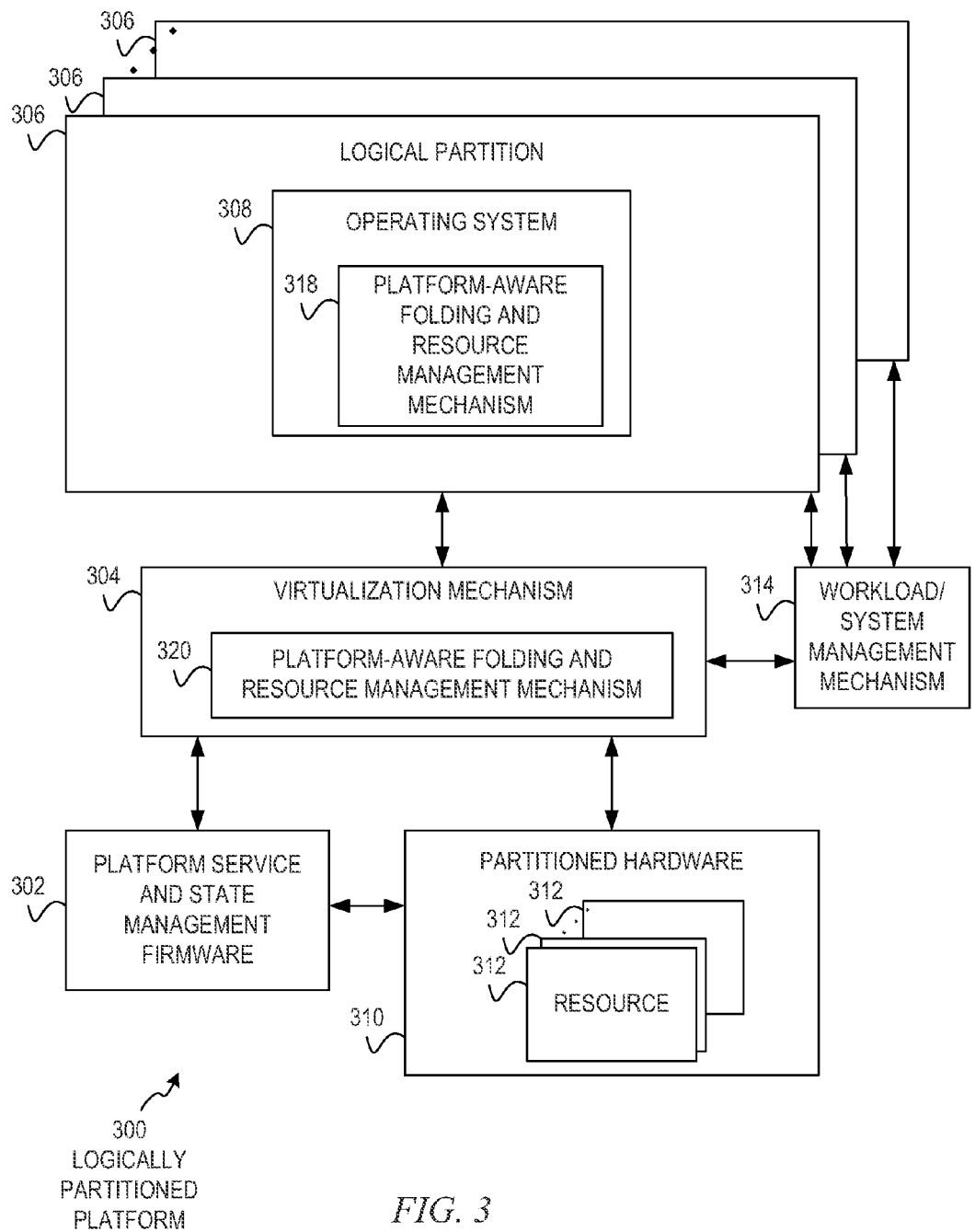
FIG. 3 depicts a block diagram of a mechanism for directed resource folding for power management in accordance with an illustrative embodiment.

FIG. 3 depicts a block diagram of a mechanism for directed resource folding for power management in accordance with an illustrative embodiment. Logically partitioned platform 300 includes platform service and state management firmware 302, virtualization mechanism 304, and logical partitions 306 each of which comprise one or more operating systems 308. Platform service and state management firmware 302 provides platform and environment monitoring and management for partitioned hardware 310, such as partitioned hardware 230 of FIG. 2, which may comprise one or more resources 312, such as processors 232-238, system memory units 240-246, input/output (I/O) adapters 248-262, storage unit 270, or the like. Platform service and state management firmware 302 may identify for each piece of partitioned hardware 310 static or invariant platform resource utilization characteristics that identify operation parameters of the one or more resources 312 under no load, such as:

1. a physical memory layout of each memory resource;
2. a low power entrance mode latency associated with those resources that may be placed into power management modes;
3. a low power exit mode latency associated with those resources that may be placed into power management modes;
4. a source of power for each resource; and/or
5. a source of cooling for each resource.

Platform service and state management firmware 302 may also monitor partitioned hardware 310 for dynamic platform resource utilization characteristics that identify operation parameters of the one or more resources 312 under a load, such as:

1. actual thermal values or thermal indicators for each resource;
2. power consumption or proxies of power for each resource;
3. usage values for each resource; and/or
4. priority indicators for those resources that have assigned priorities.

Platform service and state management firmware 302 may obtain these static and/or dynamic platform resource utilization characteristics either through solicited or unsolicited means. That is, platform service and state management firmware 302 may poll each of resources 312 for their specific platform resource utilization characteristics or platform service and state management firmware 302 may receive the specific platform resource utilization characteristics from each of resources 312 based on data observed by the resource and periodically sent by the resource. Once platform service and state management firmware 302 receives the platform resource utilization characteristic information for one or more of resources 312, platform service and state management firmware 302 either sends this platform resource utilization characteristic information to virtualization mechanism 304 based on a predetermined setting which may indicate immediately, at predetermined time intervals, or when polled, such as by a virtualization mechanism 304, one of the operating systems 308, or one of the workload/system management mechanisms 314, or the like.

Virtualization mechanism 304 may then relay the platform resource utilization characteristic information to operating systems 308 and/or workload/system management mechanism 314, which may manage the workload associated with one or more of operating systems 308 on logical partitions 306 as well as the resources controlled by virtualization mechanism 304. Virtualization mechanism 304 may also send other physical resource management characteristics associated with resources 312 to operating systems 308 and/or workload/system management mechanism 314. That is, since virtualization mechanism 304 allocates each of resources to one or more of logical partitions 306, virtualization mechanism 304 retains state information, such as voltage setting, frequency settings, or the like, associated with each of resources 312 that may be used by platform-aware folding and resource management mechanism 318 within the operating system 308, platform-aware folding and resource management mechanism 320 within virtualization mechanism 304, and/or by workload/system management mechanism 314.

Platform-aware folding and resource management mechanisms 318 and 320 and workload/system management mechanism 314 may use the platform resource utilization characteristic information to identify resource allocation, resource scheduling, dynamic folding decisions, or the like, by determining whether one or more of the following resource usage properties/conditions that identify one or more conditions under which a configuration of the one or more resources 312 needs to be modified have been met:

1. whether thermal information of one or more resources indicates that the one or more resources is above or below a predetermined thermal threshold,
2. whether power consumption of one or more resources of the set of resources has approached the actual power delivery limits for the one or more resources or relative consumption of power of one or more resources with respect to a static/dynamic cap have been exceeded,
3. whether a power consumption/energy dissipation of one or more resources is above or below a specified watermark/predetermined threshold,
4. whether a subset of the set of resources are sharing power distribution and/or cooling and whether the subset of resources has exceed preset limits for power consumption for the shared power distribution and/or exceed preset limits for cooling consumption for the shared cooling,
5. whether there is a rate and/or urgency for one or more resources to be 'freed' up and put in low power mode/powered down,
6. whether the measured power consumption and/or usage indicates that a computed energy-efficiency of the one or more resources indicates a low energy-efficiency,
7. whether memory affinity or interleaving has fallen below a specified performance level,
8. whether an average of the measured idle mode entrance latency for one or more resources is above or below a predetermined threshold,
9. whether an average of the measured idle mode exit latency for one or more resources is above or below a predetermined threshold,
10. whether state information associated with each resource indicates that one resource is a better candidate than another resource based on commonality of state information with still other resources, or
11. whether a priority assigned by a logical partition to a specific resource indicates that the resource may be folded, may be folded only in certain cases, may not be folded, or the like.

Different methods may be adopted to resolve the status with respect each of the different properties/conditions into a folding decision for a resource. The following presents one high-level approach to combining the different properties/conditions for a single folding decision. At every periodic folding decision instant, platform-aware folding and resource management mechanism 318, platform-aware folding and resource management mechanism 320, and/or workload/system management mechanism 314 compute the number of resource entities (e.g. processor cores) that are needed to sustain the aggregate resource load (e.g. total cpu utilization across the system). If the number of active resource entities exceeds the required number, then platform-aware folding and resource management mechanism 318 and/or platform-aware folding and resource management mechanism 320 identify one or more of resources 312 to fold. "Folding" is the process of releasing a virtual resource to virtualization mechanism 304. The determination of which resource to fold may be determined based on a least loaded resource, a set priority to the resources, a random selection, or the like. If the number of active resource entities is below the required number, platform-aware folding and resource management mechanism 318, platform-aware folding and resource management mechanism 320, and/or workload/system management mechanism 314 identifies one or more of resources 312 that should be activated. The determination of which resource to activate may be determined based on a least folded resource, a set priority to the resources, a random selection, or the like.

In order to choose the right resource of resources 312 to fold/unfold, platform-aware folding and resource management mechanism 318, platform-aware folding and resource management mechanism 320, and/or workload/system management mechanism 314 may establish a special metric with a value associated with each of resources 312, referred to as the Folding Desirability Metric (FDM), where the value is computed from the conditions associated with each of resources 312, such as those conditions described above. For example, FDM could be a linear combination of the observations for different platform resource utilization characteristics of each of resources 312, such as:

$$\Sigma_i \text{PropertyScale}_i * \text{Func}_i(\text{PropertyValue}_i - \text{Threshold})$$

where $\text{PropertyScale}_i$ is a precedence/priority of one property over another, $\text{PropertyValue}_i$ is a number of active cores in same socket as the $i^{th}$ core entity, and $\text{Threshold}_i$ is a threshold at which a resource should be folded or activated.

A set of resources in resources 312 with higher FDM values may be preferred for folding over other resources in resources 312 with lower values and vice-versa for unfolding. The $\text{PropertyScale}_i$ multiplicant may be used to establish the precedence/priority of one property over another. For example, if resource sub-system energy-efficiency is considered more important than average resource thermal environment, then the PropertyScale$_i$ factor for Energy-efficiency property may be set much higher than the factor for Temperature, such that temperature becomes a factor for folding consideration only when energy-efficiency of all possible candidate resources are identical. An alternative to using the PropertyScale$_i$ to establish priority among the properties is to explicitly consider higher priority platform resource utilization characteristics first and consider lower priority platform resource utilization characteristics only when all fold-able entities are on par for values with the higher priority platform resource utilization characteristics.

In addition to PropertyScale$_i$ the function Func$_i$ may be customized to each property to convert it to a comparable quantitative measure. For example, desirability is generally higher to fold the last remaining processor cores on a socket as opposed to one of many active cores on a socket in a multi-socket system. This is because the former would then free up an entire socket to be put into a lower power idle mode from reducing voltage down to retention (as opposed to using higher voltages and power on sockets where there are still some active cores). Here Func$_i$ may be (1−((PropertyValue$_i$=Number of active cores in same socket as the i$^{th}$ core entity)−(Threshold$_i$=1))/Number of usable cores in the same socket). With this, the contribution to FDM of a core, which is the lone active core on a socket, will be much higher than for a core which is one among many active cores in its socket.

Note that it is also possible for platform-aware folding and resource management mechanism 318, platform-aware folding and resource management mechanism 320, and/or workload/system management mechanism 314 to use the FDM measure or the like thereof to not just choose when to fold/not fold ones of resources 312 but even to decide which ones of resources 312 to use for any scheduling. For example, those ones of resources 312 whose FDM measure or like thereof exceed a certain threshold may be eliminated temporarily from the resource pool, i.e. folded, and added back, i.e. unfolded, only when their measures fall below the given threshold, or vice versa.

Optionally, workload/system management mechanism 314 may also examine the above conditions across the full or a partial set of logical partitions 306 in logically partitioned platform 300 to evaluate more global resource optimization opportunities. Depending on the partition environment (e.g. dedicated or shared), resource type (virtual processor, physical memory), and optimization scope (within partition, entire system, or across pool of partitions used for a 'single' job) each of platform-aware folding and resource management mechanism 318, platform-aware folding and resource management mechanism 320, or workload/system management mechanism 314 may each serve as the primary decision-making entity with optional/additional input from the others.

In one embodiment, when a partition is a dedicated partition, then platform-aware folding and resource management mechanism 318 may be the primary decision making entity. That is, if a partition is a dedicated partition, platform-aware folding and resource management mechanism 318 determines whether one or more conditions have been met for each dedicated resource assigned to the dedicated partition. Platform-aware folding and resource management mechanism 318 then determines for each dedicated resource that meets one or more of the conditions, whether the dedicated resource needs to be optimally scheduled or dynamically folded. Based on the determination, platform-aware folding and resource management mechanism 318 either performs a virtual resource management action or sends platform-directed resource management commands to platform-aware resource management mechanism 320 in virtualization mechanism 304 to perform a physical resource management action.

In another illustrative embodiment, when a partition is a shared partition, then platform-aware folding and resource management mechanism 320 may be the primary decision making entity. That is, if a partition is a shared partition and, thus, its resources are controlled by virtualization mechanism 304, then platform-aware folding and resource management mechanism 320 determines whether one or more conditions have been met for each shared resource controlled by virtualization mechanism 304. Platform-aware folding and resource management mechanism 320 then determines for each shared resource that meets one or more of the conditions, whether the shared resource needs to be optimally scheduled or dynamically folded. Based on the determination, platform-aware folding and resource management mechanism 320 either sends platform-directed resource management commands to platform-aware resource management mechanism 318 in operating system 308 to perform a virtual resource management or performs a physical resource management.

In still another illustrative embodiment, when the workload/system management mechanism 314 is managing multiple one of logical partitions 306, in order to enact the resource optimization, workload/system management mechanism 314 may send platform-directed resource management commands to platform aware folding and resource management mechanism 318 in operating system 308 and/or platform aware folding and resource management mechanism 320 in virtualization mechanism 304. Platform aware folding and resource management mechanism 318 may perform those ones of the platform-directed resource management commands that are directed to virtual resource management, such as consolidation of resource activities, task or workload allocation and/or reallocation, virtual processor folding, or the like. Platform aware folding and resource management mechanism 320 may perform those ones of the platform-directed resource management commands that are directed to physical resource management, such as physical processor folding for a shared pool, memory-interleaving aware allocation, memory folding, or the like.

By implementing resource optimization using runtime communication of platform attributes and environmental information from the platform firmware and/or hardware, the illustrative embodiments provide superior energy-efficiency, improved performance on active resources, and an increased reliability of operation, which, in turn, may enables more intelligent system stack with improved overall infrastructure efficiencies and more competitive systems and computing solutions.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
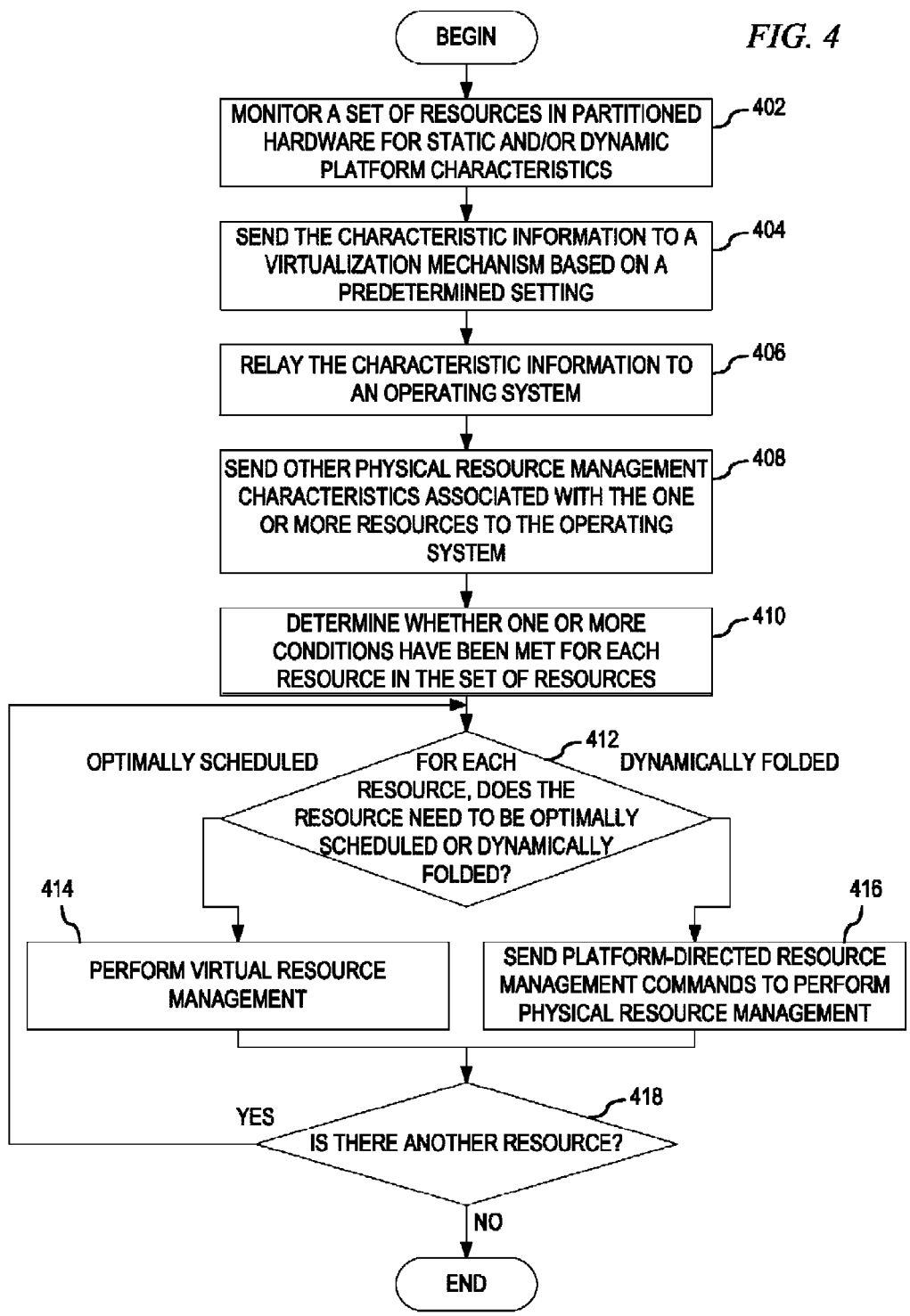
FIG. 4 depicts a flowchart outlining example operations of directed resource folding for power management for a dedicated partition in accordance with an illustrative embodiment.
Figure 5:
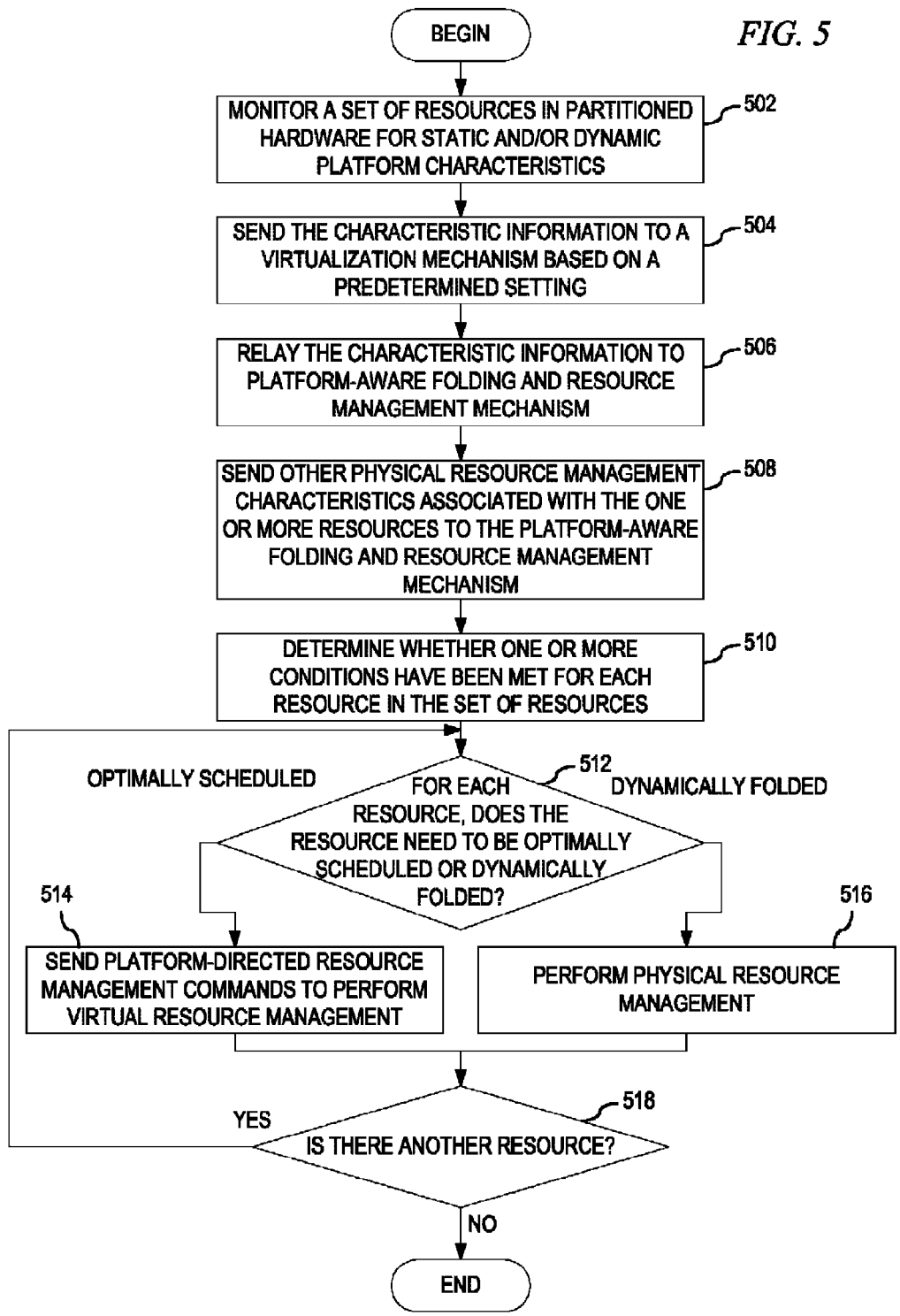
FIG. 5 depicts a flowchart outlining example operations of directed resource folding for power management for a shared partition in accordance with an illustrative embodiment.
Figure 6:
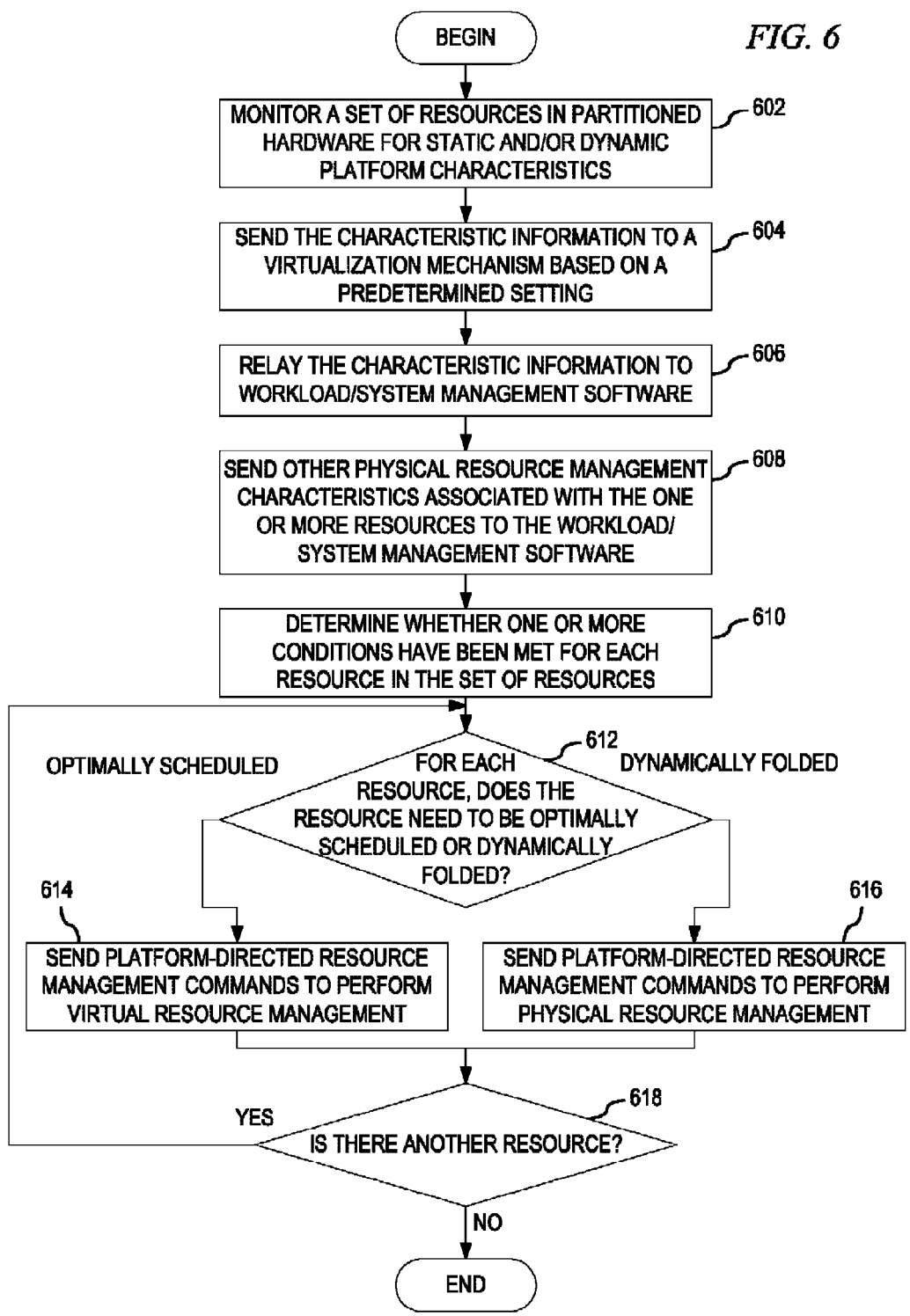
FIG. 6 depicts a flowchart outlining example operations of directed resource folding for power management of a plurality of logical partitions in accordance with an illustrative embodiment.

Referring now to FIGS. 4-6, these figures provide flowcharts outlining example operations of directed resource folding for power management. FIG. 4 depicts a flowchart outlining example operations of directed resource folding for power management for a dedicated partition in accordance with an illustrative embodiment. As the operation begins, platform service and state management firmware monitors a set of resources in partitioned hardware for static and/or dynamic platform resource utilization characteristics (step 402). The platform service and state management firmware may obtain these static and/or dynamic platform resource utilization characteristics either through solicited or unsolicited means. Once the platform service and state management firmware receives the platform resource utilization characteristic information for one or more resources, the platform service and state management firmware sends the platform resource utilization characteristic information to a virtualization mechanism based on a predetermined setting (step 404).

The virtualization mechanism then relays the platform resource utilization characteristic information to a platform-aware folding and resource management mechanism in an operating system of the dedicated partition (step 406). The virtualization mechanism may also send other physical resource management characteristics associated with the one or more resources to the platform-aware folding and resource management mechanism in the operating system (step 408). The platform-aware resource management mechanism in the operating system uses the platform resource utilization characteristic information to identify resource allocation, resource scheduling, dynamic folding decisions, or the like, for dedicated resources by determining whether one or more conditions have been met for each dedicated resource in the set of resources (step 410).

Once the platform-aware resource management mechanism in the operating system has determined whether one or more of the following conditions have been met for each dedicated resource in the set of resources, the platform-aware resource management mechanism in the operating system may perform a resource optimization such that only the required number of dedicated resources for current aggregate load are kept active and additional dedicated resources are folded with targets for specific resources to be folded based on the condition of each resource with respect to the monitored platform resource utilization characteristics. The monitored platform resource utilization characteristics are used to facilitate/enforce that those resources determined as excess for current load are specifically selected based on the monitored platform resource utilization characteristics to boost energy-efficiency, reliability and other desired operational properties (step 412). These explicitly targeted resources are then dynamically folded. The resources determined as necessary are then optimally scheduled. For each resource, if at step 412 the decision is to optimize the schedule for that dedicated resource, then platform-aware resource management mechanism in the operating system performs virtual resource management, such as consolidation of resource activities, task, or workload allocation and/or reallocation, or the like (step 414).

If at step 412 the decision is to dynamically fold that dedicated resource, then the platform-aware resource management mechanism in the operating system temporarily releases the resource to the virtualization mechanism and sends platform-directed resource management commands to a platform aware folding and resource management mechanism in the virtualization mechanism to perform those ones of the platform-directed resource management commands that are directed to physical resource management, such as processor folding using an appropriate low-power mode, memory-interleaving aware de-allocation/memory folding, or the like (step 416). From steps 414 or 416, the platform-aware resource management mechanism in the operating system determines whether there is another resource in the set of resources to analyze (step 418). If at step 418 there is another resource, then the operation returns to step 412. If at step 418 there is not another resource, then the operation terminates.

The entire flow from Begin to End in FIG. 4 is repeated for each distinct resource type managed with directed resource folding technology, for example, performed once for compute resources such as processors, then over storage resources such as main memory, and so on.

FIG. 5 depicts a flowchart outlining example operations of directed resource folding for power management for a shared partition in accordance with an illustrative embodiment. As the operation begins, platform service and state management firmware monitors a set of resources in partitioned hardware for static and/or dynamic platform resource utilization characteristics (step 502). The platform service and state management firmware may obtain these static and/or dynamic platform resource utilization characteristics either through solicited or unsolicited means. Once the platform service and state management firmware receives the platform resource utilization characteristic information for one or more resources, the platform service and state management firmware sends the platform resource utilization characteristic information to a virtualization mechanism based on a predetermined setting (step 504).

The virtualization mechanism then relays the platform resource utilization characteristic information to an operating system and optionally to a workload/system management mechanism within the operating system or outside (step 506). The virtualization mechanism may also send other physical resource management characteristics associated with the one or more resources to the operating system (step 508). The platform-aware resource management mechanism in the virtualization mechanism uses the platform resource utilization characteristic information to identify resource allocation, resource scheduling, dynamic folding decisions, or the like, for shared resources by determining whether one or more conditions have been met for each shared resource in the set of resources (step 510).

Once the platform-aware resource management mechanism in the virtualization mechanism has determined whether one or more of the following conditions have been met for each shared resource in the set of resources, the platform-aware resource management mechanism in the virtualization mechanism may perform a resource optimization such that only the required number of shared resources for current aggregate load are kept active and additional shared resources are folded with targets for specific resources to be folded based on the condition of each resource with respect to the monitored platform resource utilization characteristics. The monitored platform resource utilization characteristics are used to facilitate/enforce that only those resources that are necessary are optimally scheduled and any non-optimally used resources are dynamically folded (step 512). For each resource, if at step 512 the decision is to optimize the schedule for that shared resource, then the platform-aware resource management mechanism in the virtualization mechanism sends platform-directed resource management commands to a platform aware folding and resource management mechanism in the operating system to perform virtual resource management, such as consolidation of resource activities, task or workload allocation and/or reallocation, or the like (step 514).

If at step 512 the decision is to dynamically fold that resource, then the platform-aware resource management mechanism in the virtualization mechanism perform those ones of the platform-directed resource management commands that are directed to physical resource management, such as processor folding, memory-interleaving aware allocation, memory folding, or the like (step 516). From steps 514 or 516, the workload/system management mechanism determines whether there is another resource in the set of resources to analyze (step 518). If at step 518 there is another resource, then the operation returns to step 512. If at step 518 there is not another resource, then the operation terminates.

The entire flow from Begin to End in FIG. 5 is repeated for each distinct resource type managed with directed resource folding technology, for example, performed once for compute resources such as processors, then over storage resources such as main memory, and so on.

FIG. 6 depicts a flowchart outlining example operations of directed resource folding for power management of a plurality of logical partitions in accordance with an illustrative embodiment. As the operation begins, platform service and state management firmware monitors a set of resources in partitioned hardware for static and/or dynamic platform resource utilization characteristics (step 602). The platform service and state management firmware may obtain these static and/or dynamic platform resource utilization characteristics either through solicited or unsolicited means. Once the platform service and state management firmware receives the platform resource utilization characteristic information for one or more resources, the platform service and state management firmware sends the platform resource utilization characteristic information to a virtualization mechanism based on a predetermined setting (step 604).

The virtualization mechanism then relays the platform resource utilization characteristic information to a workload/system management mechanism associated with the plurality of logical partitions (step 606). The virtualization mechanism may also send other physical resource management characteristics associated with the one or more resources to the workload/system management mechanism (step 608). The workload/system management mechanism uses the platform resource utilization characteristic information to identify resource allocation, resource scheduling, dynamic folding decisions, or the like, by determining whether one or more conditions have been met for each resource in the set of resources (step 610).

Once the workload/system management mechanism has determined whether one or more of the following conditions have been met for each resource in the set of resources, the workload/system management mechanism may perform a resource optimization such that only the required number of resources for current aggregate load are kept active and additional resources are folded with targets for specific resources to be folded are based on the condition of each resource with respect to the monitored platform resource utilization characteristics. The monitored platform resource utilization characteristics are used to facilitate/enforce that only those resources that are necessary are optimally scheduled and any non-optimally used resources are dynamically folded (step 612). For each resource, if at step 612 the decision is to optimize the schedule for that resource, then the workload/system management mechanism sends platform-directed resource management commands to a platform aware folding and resource management mechanism in operating system to perform virtual resource management, such as consolidation of resource activities, task or workload allocation and/or reallocation, or the like (step 614).

If at step 612 the decision is to dynamically fold that resource, then for a physical resource the workload/system management mechanism sends platform-directed resource management commands to a platform aware folding and resource management mechanism in the virtualization mechanism to perform those ones of the platform-directed resource management commands that are directed to physical resource management, such as processor folding, memory-interleaving aware allocation, memory folding, or the like (step 616). For a virtual resource the workload/system management mechanism sends platform directed resource management commands to a platform aware folding and resource management mechanism in the operating system to carry out the appropriate virtual resource folding operations. From steps 614 or 616, the workload/system management mechanism determines whether there is another resource in the set of resources to analyze (step 618). If at step 618 there is another resource, then the operation returns to step 612. If at step 618 there is not another resource, then the operation terminates.

The entire flow from Begin to End in FIG. 6 is repeated for each distinct resource type managed with directed resource folding technology, for example, performed once for compute resources such as processors, then over storage resources such as main memory, and so on.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for using runtime feedback and/or communication between the platform, such as firmware, hardware, or the like, and resource scheduling layers, such as operation systems, virtualization mechanisms, or the like, for optimal management of resources by either an operating system, a virtualization mechanism, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for directed resource optimization for power management, the method comprising:
    receiving, by a management mechanism in the data processing system, at least one of a set of static platform resource utilization characteristics that identifies operation parameters of a set of resources under no load and a set of dynamic platform resource utilization characteristics that identifies operation parameters of the set of resources under load associated with the data processing system thereby forming resource utilization characteristic information, wherein the set of static platform resource utilization characteristics comprise at least one of a physical memory layout of each memory resource in the set of resources, a low power entrance mode latency associated with resources in the set of resources that may be placed into power management modes, a low power exit mode latency associated with resources in the set of resources that may be placed into power management modes, a source of power for each resource in the set of resources, or a source of cooling for each resource in the set of resources and wherein the a set of dynamic platform resource utilization characteristics comprise at least one of actual thermal values or thermal indicators for each resource in the set of resources, power consumption or proxies of power for each resource in the set of resources, usage values for each resource in the set of resources, or priority indicators for resources in the set of resources that have assigned priorities;
    determining, by the management mechanism, whether one or more resource usage conditions have been met for each resource in the set of resources using the resource utilization characteristic information, wherein the resource usage conditions identify one or more conditions under which a configuration of one or more resources in the set of resources needs to be modified;

responsive to the one or more resource usage conditions being met, performing, by the management mechanism, a resource optimization to determine at least one of a first subset of resources in the set of resources to keep active and a second subset of resources in the set of resources to dynamically fold; and based on the resource optimization, performing, by the management mechanism, at least one of a virtual resource optimization in order to optimally schedule the first subset of resources by consolidation of at least one of resource activities, task, or workload or a physical resource optimization in order to dynamically fold the second subset of resources.

2. The method of claim 1, wherein:

the management mechanism is a platform-aware folding and resource management mechanism in an operating system in the data processing system;

the determination whether the one or more resource usage conditions have been met for each resource in the set of resources using the resource utilization characteristic information is performed by the platform-aware folding and resource management mechanism;

the platform-aware folding and resource management mechanism performs the resource optimization to determine at least one of the first subset of resources in the set of resources to keep active and optimally schedule or the second subset of resources in the set of resources to dynamically fold; and based on the resource optimization;

the platform-aware folding and resource management mechanism performs the virtual resource optimization in order to optimally schedule the first subset of resources; or responsive to the resource optimization to dynamically fold the second subset of resources, the platform-aware folding and resource management mechanism directs a different platform-aware folding and resource management mechanism in a virtualization mechanism of the data processing system to perform the physical resource optimization in order to dynamically fold the physical resources mapped to the second subset of resources.

3. The method of claim 1, wherein:

the management mechanism is a platform-aware folding and resource management mechanism in a virtualization mechanism in the data processing system;

the determination whether the one or more resource usage conditions have been met for each resource in the set of resources using the resource utilization characteristic information is performed by the platform-aware folding and resource management mechanism;

the platform-aware folding and resource management mechanism performs the resource optimization to determine at least one of a first subset of shared resources in the set of resources to keep active and optimally schedule or a second subset of shared resources in the set of resources to dynamically fold; and based on the resource optimization, the platform-aware folding and resource management mechanism performs the physical resource optimization in order to dynamically fold the second set of shared resources or, if the resource optimization is to optimally schedule the first subset of shred resources, the platform-aware folding and resource management mechanism in the virtualization mechanism directs a different platform-aware folding and resource management mechanism in an operating system of a shared logical partition in the data processing system to perform the virtual resource optimization in order to optimally schedule the first subset of shared resources.

4. The method of claim 1, wherein:

the management mechanism is a workload/system management mechanism in the data processing system managing a plurality of logical partitions;

the determination whether the one or more resource usage conditions have been met for each resource in the set of resources using the resource utilization characteristic information is performed by the workload/system management mechanism;

the workload/system management mechanism performs the resource optimization to determine at least one of the first subset of resources in the set of resources to keep active and optimally schedule or the second subset of resources in the set of resources to dynamically fold; and based on the resource optimization, the workload/system management mechanism sends platform-directed resource management commands to: a platform-aware folding and resource management mechanism in an operating system of the data processing system to perform the virtual resource optimization in order to optimally schedule the first subset of resources, a different platform-aware folding and resource management mechanism in a virtualization mechanism of the data processing system to perform the physical resource optimization in order to dynamically fold the second subset of resources, or the platform-aware folding and resource management mechanism in the operating system of the data processing system to perform the dynamic folding of the second subset of resources, wherein the second subset of resources targeted for folding are virtual resources.

5. The method of claim 1, wherein the at least one of the set of static platform resource utilization characteristics or the set of dynamic platform resource utilization characteristics for the set of resources are obtained either through solicited means or unsolicited means.

6. The method of claim 1, wherein the management mechanism additionally uses other physical resource management characteristics associated with the one or more resources to determine whether the one or more resource usage conditions have been met for each resource in the set of resources.

7. The method of claim 1, wherein the one or more resource usage conditions are selected from a group consisting of:

whether thermal information of one or more resources of the set of resources indicates that the one or more resources is above or below a predetermined thermal threshold;

whether power consumption of one or more resources of the set of resources has approached the actual power delivery limits for the one or more resources or relative consumption of power of one or more resources of the set of resources with respect to a static/dynamic cap have been exceeded;

whether a power consumption/energy dissipation of one or more resources of the set of resources is above or below a specified watermark or predetermined threshold;

whether a subset of the set of resources are sharing power distribution or cooling and whether the subset of resources has exceed preset limits for power consumption for the shared power distribution or exceed preset limits for cooling consumption for the shared cooling;

whether there is a rate or urgency for one or more resources of the set of resources to be 'freed' up and put in low power mode/powered down;
whether the measured power consumption and/or usage indicates that a computed energy-efficiency of one or more resources of the set of resources indicates a low energy-efficiency;
whether memory affinity or interleaving has fallen below a specified performance level;
whether an average of the measured idle mode entrance latency for one or more resources of the set of resources is above or below a predetermined threshold;
whether an average of the measured idle mode exit latency for one or more resources of the set of resources is above or below a predetermined threshold;
whether state information associated with each resource in the set of resources indicates that one resource is a better candidate than another resource based on commonality of state information with still other resources in the set of resources; or
whether a priority assigned by a logical partition to a specific resource in the set of resources indicates that the specific resource may either be folded, be folded only in certain cases, or not be folded.

8. A computer program product comprising a computer readable storage medium having a computer readable program stored therein, wherein the computer readable program, when executed on a computing device, causes the computing device to:
receive at least one of a set of static platform resource utilization characteristics that identifies operation parameters of a set of resources under no load and a set of dynamic platform resource utilization characteristics that identifies operation parameters of the set of resources under load associated with the computing device thereby forming resource utilization characteristic information, wherein the set of static platform resource utilization characteristics comprise at least one of a physical memory layout of each memory resource in the set of resources, a low power entrance mode latency associated with resources in the set of resources that may be laced into power management modes, a low power exit mode latency associated with resources in the set of resources that may be placed into power management modes, a source of power for each resource in the set of resources, or a source of cooling fir each resource in the set of resources and wherein the a set of dynamic platform resource utilization characteristics comprise at least one of actual thermal values or thermal indicators for each resource in the set of resources, power consumption or proxies of power for each resource in the set of resources, usage values for each resource in the set of resources, or priority indicators for resources in the set of resources that have assigned priorities;
determine whether one or more resource usage conditions have been met for each resource in the set of resources using the resource utilization characteristic information, wherein the resource usage conditions identify one or more conditions under which a configuration of one or more resources in the set of resources needs to be modified;
responsive to the one or more resource usage conditions being met, perform a resource optimization to determine at least one of a first subset of resources in the set of resources to keep active and a second subset of resources in the set of resources to dynamically fold; and
based on the resource optimization, perform at least one of a virtual resource optimization in order to optimally schedule the first subset of resources by consolidation of at least one of resource activities, task, or workload or a physical resource optimization in order to dynamically fold the second subset of resources.

9. The computer program product of claim 8, wherein the computer program product is in a platform-aware folding and resource management mechanism in an operating system of the computing device and wherein the computer readable program further causes the platform-aware folding and resource management mechanism to:
determine whether the one or more resource usage conditions have been met for each resource in the set of resources using the resource utilization characteristic information;
perform the resource optimization to determine at least one of the first subset of resources in the set of resources to keep active and optimally schedule or the second subset of resources in the set of resources to dynamically fold; and
based on the resource optimization:
perform the virtual resource optimization in order to optimally schedule the first subset of resources, or
responsive to the resource optimization indicating to dynamically fold the second subset of resources, direct a different platform-aware folding and resource management mechanism in a virtualization mechanism of the computing device to perform the physical resource optimization in order to dynamically fold the physical resources mapped to the second subset of resources.

10. The computer program product of claim 8, wherein the computer program product is in a platform-aware folding and resource management mechanism in a virtualization mechanism of the computing device and wherein the computer readable program further causes the platform-aware folding and resource management mechanism to:
determine whether the one or more resource usage conditions have been met for each resource in the set of resources using the resource utilization characteristic information is performed by the platform-aware folding and resource management mechanism;
perform the resource optimization to determine at least one of a first subset of shared resources in the set of resources to keep active and optimally schedule or a second subset of shared resources in the set of resources to dynamically fold; and
based on the resource optimization:
perform the physical resource optimization in order to dynamically fold the second set of shared resources, or
responsive to the resource optimization indicating to optimally schedule the first subset of shared resources, direct a different platform-aware folding and resource management mechanism in an operating system of a shared logical partition in the computing device to perform the virtual resource optimization in order to optimally schedule the first subset of shared resources.

11. The computer program product of claim 8, wherein the computer program product is in a workload/system management mechanism in the computing device managing a plurality of logical partitions and wherein the computer readable program further causes the workload/system management mechanism to:

determine whether the one or more resource usage conditions have been met for each resource in the set of resources using the resource utilization characteristic information is performed by the workload/system management mechanism;

perform the resource optimization to determine at least one of the first subset of resources in the set of resources to keep active and optimally schedule or the second subset of resources in the set of resources to dynamically fold; and based on the resource optimization, send platform-directed resource management commands to:
  a platform-aware folding and resource management mechanism in an operating system of the computing device to perform the virtual resource optimization in order to optimally schedule the first subset of resources,
  a different platform-aware folding and resource management mechanism in a virtualization mechanism of the data processing system to perform the physical resource optimization in order to dynamically fold the second subset of resources, or
  the platform-aware folding and resource management mechanism in the operating system of the data processing system to perform the dynamic folding of the second subset of resources, wherein the second subset of resources targeted for folding are virtual resources.

12. An apparatus, comprising:
a processor; and
a memory coupled to the processor, wherein the memory comprises instructions which, when executed by the processor, cause the processor to:
receive at least one of a set of static platform resource utilization characteristics that identifies operation parameters of a set of resources under no load and a set of dynamic platform resource utilization characteristics that identifies operation parameters of the set of resources under load associated with the apparatus thereby forming resource utilization characteristic information, wherein the set of static platform resource utilization characteristics comprise at least one of a physical memory layout of each memory resource in the set of resources, a low power entrance mode latency associated with resources in the set of resources that may be placed into power management modes, a low power exit mode latency associated with resources in the set of resources that may be placed into power management modes, a source of power for each resource in the set of resources, or a source of cooling for each resource in the set of resources and wherein the a set of dynamic platform resource utilization characteristics comprise at least one of actual thermal values or thermal indicators for each resource in the set of resources, power consumption or proxies of power for each resource in the set of resources, usage values for each resource in the set of resources, or priority indicators for resources in the set of resources that have assigned priorities;
determine whether one or more resource usage conditions have been met for each resource in the set of resources using the resource utilization characteristic information, wherein the resource usage conditions identify one or more conditions under which a configuration of one or more resources in the set of resources needs to be modified;
responsive to the one or more resource usage conditions being met, perform a resource optimization to determine at least one of a first subset of resources in the set of resources to keep active and a second subset of resources in the set of resources to dynamically fold; and
based on the resource optimization, perform at least one of a virtual resource optimization in order to optimally schedule the first subset of resources by consolidation of at least one of resource activities, task, or workload or a physical resource optimization in order to dynamically fold the second subset of resources.

13. The apparatus of claim 12, wherein the instructions are in a platform-aware folding and resource management mechanism in an operating system of the apparatus and wherein the instructions further cause the processor to:
determine whether the one or more resource usage conditions have been met for each resource in the set of resources using the resource utilization characteristic information;
perform the resource optimization to determine at least one of the first subset of resources in the set of resources to keep active and optimally schedule or the second subset of resources in the set of resources to dynamically fold; and
based on the resource optimization:
  perform the virtual resource optimization in order to optimally schedule the first subset of resources, or
  responsive to the resource optimization indicating to dynamically fold the second subset of resources, direct a different platform-aware folding and resource management mechanism in a virtualization mechanism of the apparatus to perform the physical resource optimization in order to dynamically fold the physical resources mapped to the second subset of resources.

14. The apparatus of claim 12, wherein the instructions are in a platform-aware folding and resource management mechanism in a virtualization mechanism of the apparatus and wherein the instructions further cause the processor to:
determine whether the one or more resource usage conditions have been met for each resource in the set of resources using the resource utilization characteristic information is performed by the platform-aware folding and resource management mechanism;
perform the resource optimization to determine at least one of a first subset of shared resources in the set of resources to keep active and optimally schedule or a second subset of shared resources in the set of resources to dynamically fold; and
based on the resource optimization:
  perform the physical resource optimization in order to dynamically fold the second set of shared resources, or
  responsive to the resource optimization indicating to optimally schedule the first subset of shred resources, direct a different platform-aware folding and resource management mechanism in an operating system of a shared logical partition in the apparatus to perform the virtual resource optimization in order optimally schedule the first subset of shared resources.

15. The apparatus or claim 12, wherein the instructions are in a workload/system management mechanism in the apparatus managing a plurality of logical partitions and wherein the instructions further cause the processor to:
determine whether the one or more resource usage conditions have been met for each resource in the set of resources using the resource utilization characteristic information is performed by the workload/system management mechanism;
perform the resource optimization to determine at least one of the first subset of resources in the set of resources to keep active and optimally schedule or the second subset of resources in the set of resources to dynamically fold; and based on the resource optimization, send platform-directed resource management commands to:
- a platform-aware folding and resource management mechanism in an operating system of the apparatus to perform the virtual resource optimization in order to optimally schedule the first subset of resources,
- a different platform-aware folding and resource management mechanism in a virtualization mechanism of the data processing system to perform the physical resource optimization in order to dynamically fold the second subset of resources, or
- the platform-aware folding and resource management mechanism in the operating system of the data processing system to perform the dynamic folding of the second subset of resources, wherein the second subset of resources targeted for folding are virtual resources.

* * * * *